United States Patent [19]
Smith

[11] 4,274,436
[45] Jun. 23, 1981

[54] WAFER-TYPE SWING CHECK VALVE CONSTRUCTION

[75] Inventor: Russell G. Smith, Cincinnati, Ohio
[73] Assignee: Xomox Corporation, Cincinnati, Ohio
[21] Appl. No.: 67,056
[22] Filed: Aug. 16, 1979
[51] Int. Cl.³ .............................................. F16K 15/03
[52] U.S. Cl. ................... 137/515.7; 137/527; 137/527.8; 137/375; 251/151
[58] Field of Search ................... 137/515.7, 527.8, 375, 137/527; 251/151

[56] References Cited
U.S. PATENT DOCUMENTS

| | | | |
|---|---|---|---|
| 3,565,107 | 2/1971 | Bunch | 137/515.7 |
| 3,703,910 | 11/1972 | Smith | 137/375 |
| 3,720,228 | 3/1973 | Wheatley, Jr. | 137/515.7 X |
| 3,817,277 | 6/1974 | Wheatley | 137/515.7 |
| 3,825,030 | 7/1974 | Kalsi | 137/375 |
| 3,916,943 | 11/1975 | Hester et al. | 137/375 |
| 3,948,284 | 4/1976 | Walworth | 137/375 X |

*Primary Examiner*—William R. Cline
*Attorney, Agent, or Firm*—Kinney & Schenk

[57] ABSTRACT

A wafer-type swing check valve construction having a metallic housing body provided with an inlet and an outlet interconnected together by a valve seat that is adapted to be opened and closed by the effect of a pressure differential acting across a metallic valve disc pivotally mounted to the housing body by a pivot pin-like part of the disc that has opposed ends thereof rotatably received in cooperating recess means in the housing body to provide a pivot arrangement for the valve disc, the valve disc cooperating with the valve seat to define a seating area therewith. A resilient corrosion resistant plastic material completely covers the valve disc and the pivot pin-like part thereof and all of the wettable areas of the housing body so that the housing body and the valve disc and the pivot pin-like part thereof are completely protected from corrosive fluids and the like that might be passed through the valve construction, the plastic material also providing for corrosion free pivoting action of the pivot pin-like part in the recess means as the valve disc is moved by the pressure differential relative to the valve seat and permitting the valve disc to form a tight seal with the valve seat when the pressure differential closes the valve disc against the valve seat. The valve construction can be clamped between mating flanges of a pair of conduits to couple the same together without having any point for external leakage around the pivot arrangement.

13 Claims, 5 Drawing Figures

WAFER-TYPE SWING CHECK VALVE CONSTRUCTION

BACKGROUND OF THE INVENTION

1. Field of the Invention

This invention relates to an improved wafer-type swing check valve construction.

2. Prior Art Statement

It is known to provide a wafer-type swing check valve construction having a metallic housing body provided with an inlet and an outlet interconnected together by a valve seat that is adapted to be opened and closed by the effect of a pressure differential acting across a metallic valve disc pivotally mounted to the housing body by a pivot pin-like part of the valve disc that has opposed ends thereof rotatably received in cooperating recess means in the housing body so that the pivot pin-like part will pivot in the recess means as the valve disc is moved by the pressure differential relative to the valve seat.

For example, see the following five U.S. patents:
(1) U.S. Pat. No. 2,532,067—La Bour
(2) U.S. Pat. No. 2,930,400—Wheatley
(3) U.S. Pat. No. 3,933,173—Kajita
(4) U.S. Pat. No. 4,054,153—Guyton
(5) U.S. Pat. No. 4,128,111—Hansen et al It appears that the wafer-type swing check valve constructions of the above five items (1)–(5) each has the pivot pin-like part of the valve disc either fastened thereto or rotatably mounted thereto while being disposed in a recess means of the housing body, the check valve construction of item (4) above also appearing to have an annular groove provided either in the valve disc or the valve seat and receiving an annular flexible seal member therein to provide for a resilient seating arrangement between the valve disc and the valve seat while the housing body of item (2) above appears to have annular grooves in the coupling surfaces thereof for respectively receiving annular resilient members therein for sealing to cooperating coupling surfaces that couple the wafer-type swing check valve construction thereof in a fluid system.

It is also known to completely coat metallic valve members of the poppet-type, plug-type and the ball-type with plastic material to protect the same as well as completely line or coat the cooperating housing bodies therefor with such plastic material.

For example, see the following three U.S. patents:
(6) U.S. Pat. No. 3,825,030—Kalsi
(7) U.S. Pat. No. 3,948,284—Walworth
(8) U.S. Pat. No. 3,703,910—Smith.

SUMMARY OF THE INVENTION

It is a feature of this invention to provide a wafer-type swing check valve construction that will not be adversely affected by the corrosive action of corrosive fluid and the like being passed through the valve construction.

In particular, it has been found according to the teachings of this invention that an improved wafer-type swing check valve construction can be formed of two simple parts, namely a metallic housing body and a metallic valve disc, with both parts being covered on all of the wettable areas thereof with a resilient corrosion resistant plastic material so that the housing body and the valve disc are completely protected from corrosive fluids and the like that might be passed through the valve construction.

Further, it has been found according to the teachings of this invention that since such plastic material is in the seating area of the valve construction, such plastic material will provide a tight seal between the valve disc and the valve seat of the valve body through a cold forming action of the plastic material as will be apparent hereinafter.

In addition, it has been found according to the teachings of this invention that since such plastic material covers the pivot pin-like part of the valve disc and the recess means of the housing body that loosely receives the pivot pin-like part to pivotally mount the valve disc in the housing body without requiring any holes to be formed in the housing body for such pivot arrangement that might adversely leak fluid, such plastic material will provide for corrosion free pivoting action of the valve disc as will be apparent hereinafter.

Also, it has been found according to the teachings of this invention that the matallic parts of the valve disc and valve seat can be so made that same will provide a metal to metal back-up closing of the valve seat should a fire or the like destroy the plastic material thereon in the valve seating area thereof and thereby effectively prevent further feeding of fluid through the valve construction to the fire as will be apparent hereinafter.

Further, it was also found according to the teachings of this invention that since the plastic material on the valve disc and housing body is disposed to cover substantially all wettable areas thereof that would be exposed to corrosive fluid and the like that might be passed through the valve construction, the valve disc and valve body can be formed of a metallic material that is relatively inexpensive.

Accordingly, one embodiment of this invention provides a wafer-type swing check valve construction having a metallic housing body provided with an inlet and an outlet interconnected together by a valve seat that is adapted to be opened and closed by the effect of a pressure differential acting across a metallic valve disc pivotally mounted to the housing body by a pivot pin-like part of the disc that has opposed ends thereof rotatably received in cooperating recess means in the housing body to provide a pivot arrangement for the valve disc, the valve disc cooperating with the valve seat to define a seating area therewith. A resilient corrosion resistant plastic material completely covers the valve disc and the pivot pin-like part thereof and all of the wettable areas of the housing body so that the housing body and the valve disc and the pivot pin-like part thereof are completely protected from corrosive fluids and the like that might be passed through the valve construction, the plastic material also providing for corrosion free pivoting action of the pivot pin-like part in the recess means as the valve disc is moved by the pressure differential relative to the valve seat and permitting the valve disc to form a tight seal with the valve seat when the pressure differential closes the valve disc against the valve seat. The housing body initially has opening means passing therethrough and the plastic material fills the opening means to close the same and integrally join together parts of the plastic material disposed on opposite sides of the housing body, the opening means connecting with the portions of the housing body that define the parts of the recess means that contact the plastic material on the pivot pin-like part of the valve disc.

Therefore, it is an object of this invention to provide an improved wafer-type swing check valve construction having one or more of the novel features of this invention as set forth above or hereinafter shown or described.

Other objects, uses and advantages of this invention are apparent from a reading of this description which proceeds with reference to the accompanying drawings forming a part therein and wherein:

DESCRIPTION OF THE PREFERRED EMBODIMENT

Figure 1:
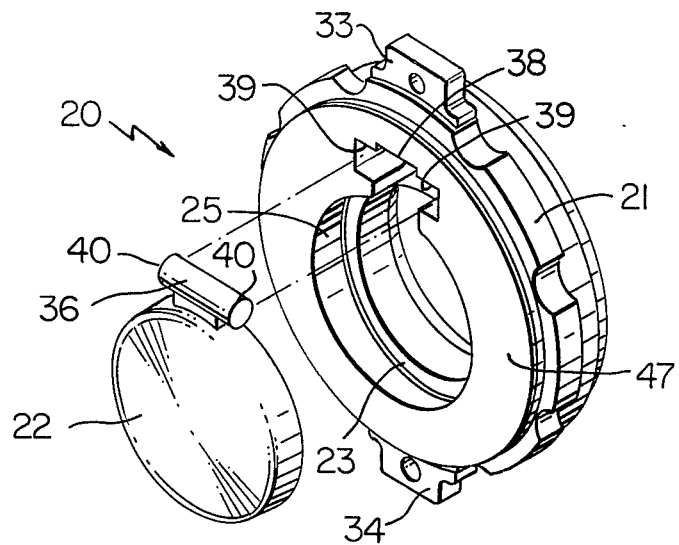
FIG. 1 is an exploded perspective view of the improved wafer-type swing check valve construction of this invention.

While the various features of this invention are hereinafter described and illustrated as being particularly adapted to provide a wafer-type swing check valve construction for being disposed in a fluid system that is adapted to handle corrosive fluids and the like, it is to be understood that the various features of this invention can be utilized singly or in any combination thereof to provide a wafer-type swing check valve construction for any desired fluid system.

Therefore, this invention is not to be limited to only the embodiment illustrated in the drawings, because the drawings are merely utilized to illustrate one of the wide variety of uses of this invention.

Figure 2:
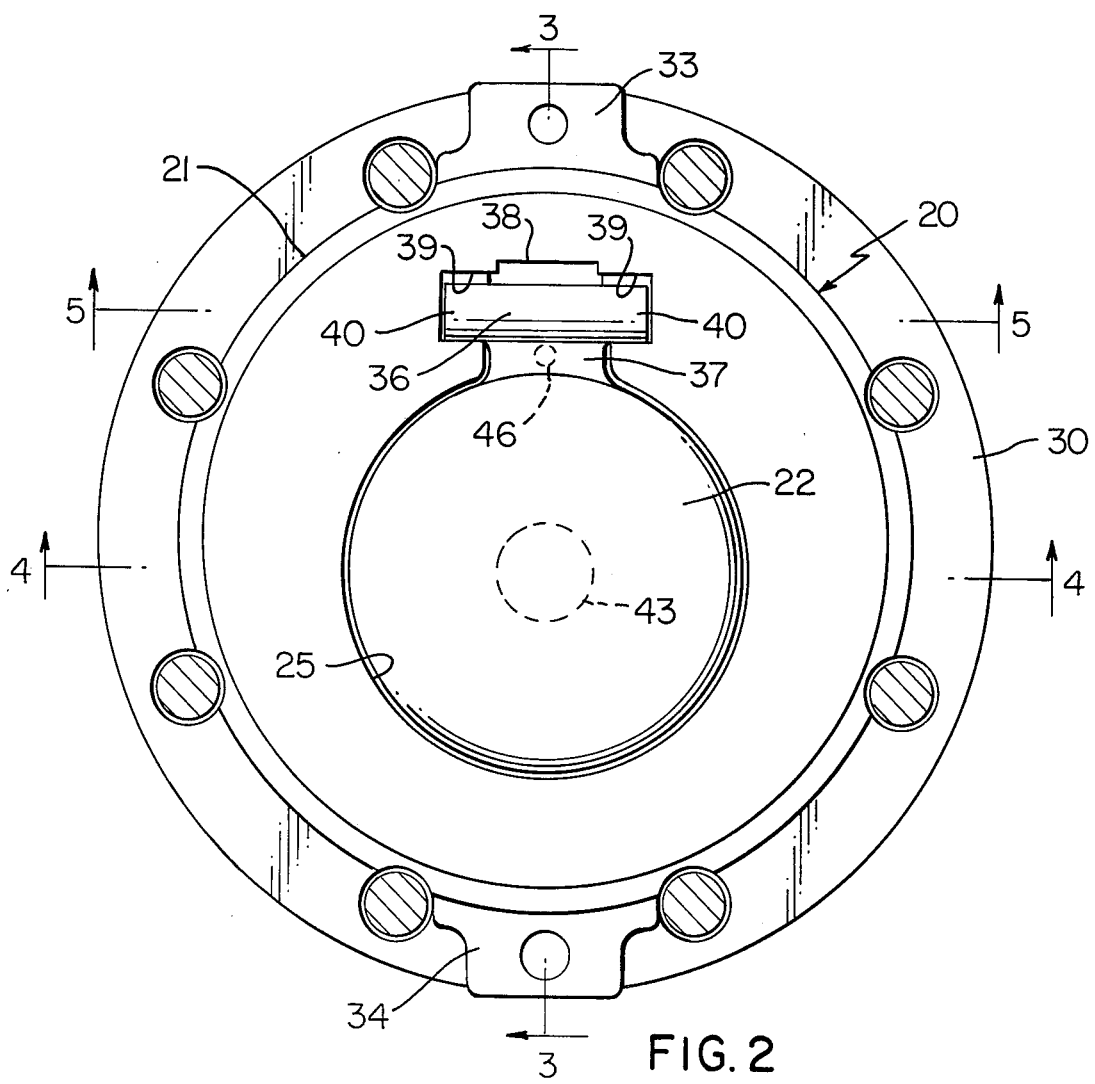
FIG. 2 is a front view of the wafer-type swing check valve construction of FIG. 1 in its assembled condition.
Figure 3:
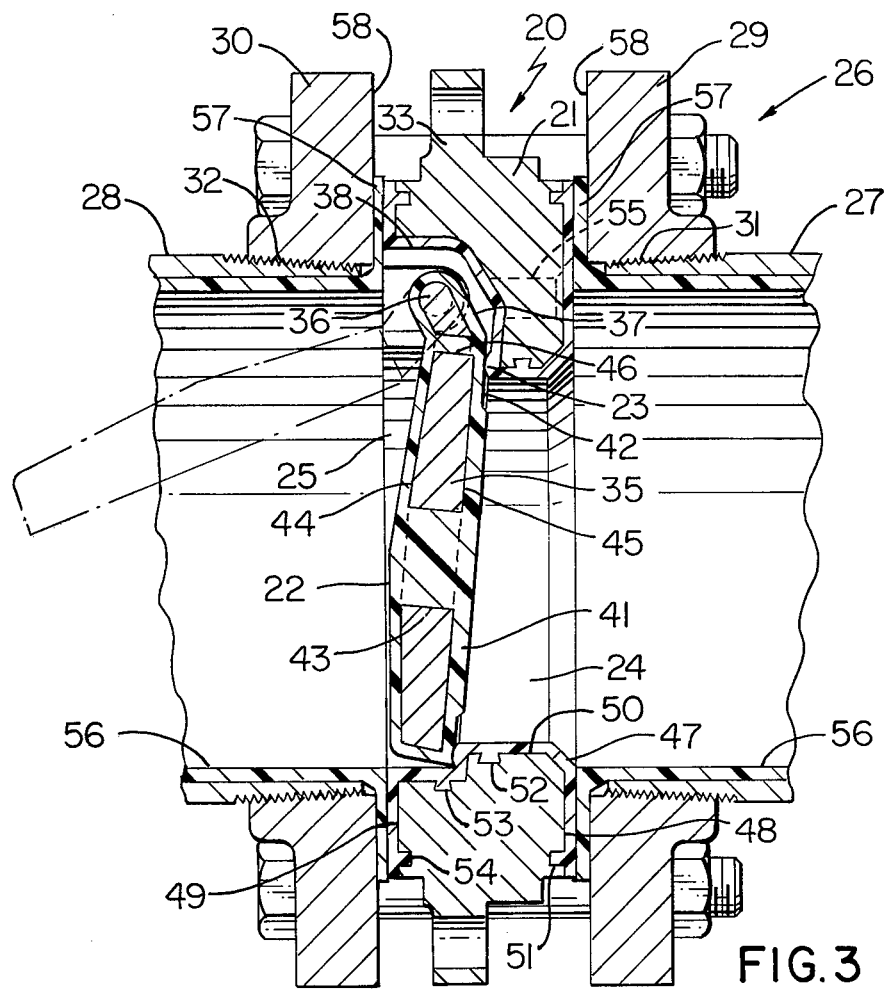
FIG. 3 is a cross-sectional view taken on line 3—3 of FIG. 2 and illustrates the wafer-type swing check valve construction of this invention being utilized in a fluid system.
Figure 4:
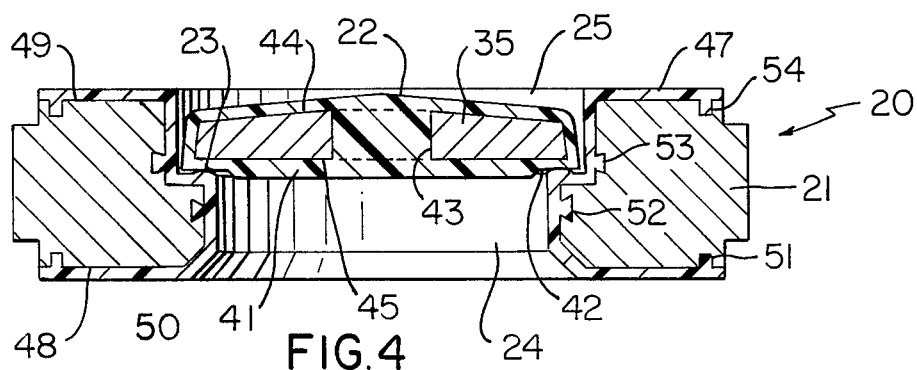
FIG. 4 is a cross-sectional view taken on line 4—4 of FIG. 2.
Figure 5:
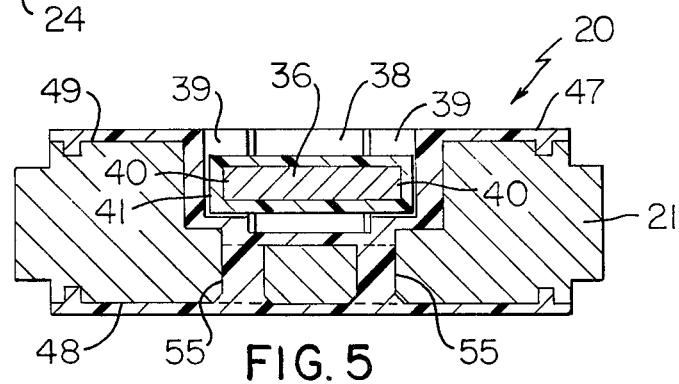
FIG. 5 is a cross-sectional view taken on line 5—5 of FIG. 2.

Referring now to FIGS. 1, 2 and 3, the improved wafer-type swing check valve construction of this invention is generally indicated by the reference numeral 20 and comprises a metallic housing body 21 pivotally carrying a metallic valve disc 22 that is adapted to open and close a valve seat 23 of the housing body 21 by a pressure differential acting across the valve disc 22 in a conventional manner, the valve seat being adapted to interconnect an inlet 24 of the housing body 21 with an outlet 25 thereof.

The housing body 21 is adapted to be disposed in a fluid system, such as the fluid system that is generally indicated by the reference numeral 26 in FIG. 3 and comprises a pair of fluid conveying conduits 27 and 28 respectively carrying coupling flanges 29 and 30 that are respectively threadedly disposed on externally threaded ends 31 and 32 of the conduits 27 and 28 and are adapted to be bolted together by suitable fastening means in a manner conventional in the art to sandwich and hold the wafer-type swing check valve construction 20 of this invention therebetween in a conventional manner.

In this manner, the conduit 27 is coupled in fluid communication to the inlet 24 of the valve construction 20 while the conduit 28 is coupled in fluid communication to the outlet 25 of the valve construction 20 so that the valve disc 22 effectively controls the fluid flow between the conduits 27 and 28 by only permitting fluid flow to pass from the conduit 27 to the conduit 28 and preventing fluid flow from the conduit 28 back to the conduit 27 in a manner well known for gravity and pressure differential operated wafer-type swing check valve constructions.

The valve disc 22 of this invention is formed from metallic material in any suitable manner to define a substantially circular disc member or portion 35 being intergrally interconnected to a cylindrical pivot pin-like part 36 by an interposed flange portion 37 whereby the pivot pin-like part 36 is fixed to the disc portion 35 by the flange 37.

The housing body 21 is likewise formed from any suitable metallic material in any suitable manner and has a recess means 38 formed therein that intersects with the valve seat 23 and is so shaped that the same defines a pair of axially aligned substantially cylindrical recess means 39 that are adpated to loosely receive the opposed ends 40 of the pivot pin-like part 36 of the valve disc 22 therein in the manner schematically illustrated in FIG. 1 so as to pivotally mount the valve disc 22 of the valve body 21 and permit the valve disc 22 to float and thereby seek its own valve seat.

However, as previously stated, one of the features of this invention is to provide substantially corrosion free movement of the pivot pin 36 within the recess means 38, 39 of the valve body 21 during the opening and closing movement of the valve disc 22 relative to the valve seat 23 caused by the pressure differential acting across the valve disc 22.

As also previously stated, this feature is provided by covering the entire valve disc 22 and its pivot pin-like part 36 with a resilient corrosion resistant plastic material which is indicated by the reference numeral 41 in the drawings and can comprise any suitable plastic material that can withstand the corrosive fluids to be utilized in the fluid system 26 as well as to provide a substantially corrosion free movement of the pivot pin-like part 36 in the recess means 38, 39.

For example, and without imposing a limitation on this invention, such plastic material 41 can comprise a fluorinated ethylene propylene sold under the trademark TEFLON-FEP by E. I. DuPont de Neumours, Inc. of Wilmington, Del.

Also, while such plastic material 41 can be disposed on the valve disc 22 in any suitable manner to be carried thereby and thereby fully protect the metallic material thereof, one such method is to mold the plastic material 41 by heat and pressure onto the preformed valve disc 22 and thereafter machine any desired area or areas of the plastic material 41. For example, such machining operation can be utilized to provide an annular flat surface 42 that will be the surface that contacts the valve seat 23 for opening and closing the same.

In addition, the disc portion 35 of the valve disc 22 can be provided with a central opening 43 passing completely therethrough to be completely filled by the plastic material 41 during the coating or covering operation so as to more firmly hold opposed parts of the plastic material 41 against the opposite sides 44 and 45 of the disc portion 35.

Also, the flange 37 of the valve disc 22 can be provided with an opening 46 passing therethrough to be filled by the plastic material 41 to more firmly hold opposed portions of the plastic material 41 against the opposite sides 44 and 45 of the flange 37.

As previously stated, it was found according to the teachings of this invention that when the recess means 39 of the valve body 21 are covered with a plastic material that is also substantially corrosion resistant, the cooperating plastic parts of the recess means 39 and the pivot pin-like part 36 will further enhance the corrosion and friction free movement of the pivot pin-like part 36 in the recess means 38, 39.

Thus, it can be seen that the housing body 21 is covered with plastic material that is indicated by the reference numeral 47 not only in the entire recess means 38, 39 thereof but also on all other wettable surfaces thereof that would be exposed to corrosive fluids that might pass through the fluid system 26.

For example, the housing body 21 has opposed flat parallel end surfaces 48 and 49 that are to be trapped between the coupling flanges 29 and 30 of the conduits 27 and 28 and such surfaces 48 and 49 are covered by the plastic material 47, as well as the internal peripheral surface 50 of the housing body 21, so that the housing body 21 can be formed of relatively inxpensive metallic material that will be fully protected by the plastic material 47. In this manner, the housing body 21 need not be formed of expensive corrosive resistant metallic material as in other wafer-type swing check valve constructions.

While the plastic material 47 can be secured to the housing body 21 in any suitable manner and be formed of any suitable material, the same can be of the aforementioned Teflon-FEP and can be secured to the housing body 21 by a heat and pressure molding operation in the same manner as previously described for the valve disc 22.

In order to enhace the securement of the plastic material 47 to the housing body 21, the housing body 21 can be provided with a plurality of annular grooves 51, 52, 53 and 54 as illustrated to receive the plastic material 47 therein during the molding operation to thereby mechanically hold the plastic material 47 to the housing body 21. If desired, some or all of the annular grooves can be provided with a truncated triangular cross-sectional configuration, such as grooves 52 and 53, to provide for a dovetail interlocking relation of the housing body 21 to the plastic coating 47.

In addition, in order to more fully hold the plastic material 47 in the recess means 39 of the housing body 21, the housing body 21 can be provided with a pair of openings 55 that respectively extend between the recess means 39 and the side 48 of the housing body 21 to be completely filled with the plastic material 47 during the molding operation so that the filled openings 55 firmly lock opposed parts of the plastic material 47 to the housing body 21 in the same manner as the openings 43 and 46 in the valve disc 22 as previously described.

Therefore, it can be seen that all of the parts of the wafer-type swing check valve construction 20 of this invention that would be exposed to corrosive fluids that might pass therethrough are completely covered by corrosion resistant plastic material so that the metallic material forming the valve disc 22 and housing body 21 can be a relatively inexpensive metallic material that would be protected from the corrosive fluid whereby the overall cost of the valve construction 10 of this invention is less than when such structure is formed from an uncoated expensive metallic material that is substantially corrosion resistant.

If desired, the conduits 27 and 28 in the fluid system 26 that receive the improved wafer-type swing check valve construction 20 of this invention therebetween can be lined with plastic material that is indicated by the reference numeral 56 in FIG. 3 with the plastic material 56 having portions 57 thereof extending upwardly against at least portions of the facing surfaces 58 on the coupling flanges 29 and 30 to engage against the plastic material 47 on the facing sides 48 and 49 of the housing body 21 to fluid seal the coupling flanges 29 and 30 to the housing body 21 of the valve construction 20 of this invention in the manner illustrated in FIG. 3 when the bolts for the flanges 29 and 30 are tightened to draw the same toward each other in a conventional manner.

Therefore, it can be seen that the improved wafer-type swing check valve construction 20 of this invention can be formed of relatively few parts and in a relatively simple manner to operate in a manner now to be described.

When it is desired to couple the improved wafer-type swing check valve construction 20 of this invention in a fluid system, such as the fluid system 26 illustrated in FIG. 3, the check valve construction 20 is inserted between the coupling flanges 29 and 30 of the conduits 27 and 28 to be positioned therebetween and fastened therebetween by the fastening means or bolts passing between the coupling flanges 29 and 30 and which, when tightened, will draw the flanges 29 and 30 toward each other to positively sandwich and seal the housing body 21 therebetween in the position illustrated in FIG. 3 in a manner well known in the art.

Thereafter, any fluid flow that is directed through the conduit 27 toward the conduit 28, will force the gravity held check valve 22 away from the valve seat 23 to flow into the conduit 28 through the now opened valve seat 23 in a manner well known in the art. However, should any back flow pressure be created in the conduit 28 or the fluid pressure in the inlet conduit 27 cease, gravity and such back pressure, if present, will pivot the valve disc 22 back to the closed position illustrated in FIG. 3 against the valve seat 23 so as to prevent any fluid flow from the outlet conduit 28 to the inlet conduit 27 in a manner well known in the art for wafer-type swing check valve constructions of the gravity and pressure differential close type.

However, it can be seen that such pivoting movement of the valve disc 22 is accomplished by the plastic coated pivot pin-like part 27 rotating in the cooperating recess means 39 of the housing body 21 and since the pivot pin-like part 36 is plastic coated or covered and the recess means 39 which receives the same are likewise plastic coated or covered, the corrosive action of the fluid in the system 26 cannot attack such parts. Further, since the plastic material of such contacting parts has a low coefficient of friction, free rotating motion is provided between the pivot pin-like part 36 and the recess means 39 in a manner not provided in prior known wafer-type swing check valve constructions.

Therefore, it can be seen that even though the pivot pin-like part 36 of the valve disc 22 of this invention is loosely received in the recess means 39 of the housing body 21 in a manner conventional for wafer-type swing check valve constructions, corrosive fluid is also permitted to be received in such loosely filled recess means 39 but cannot attack any of the metallic parts thereof whereby no corrosion will occur between the mating surfaces of the pivot pin-like part 36 of the valve disc 22 and the recess means 39 of the housing body 21. Also, since the contact is between plastic surfaces of the pivot pin-like part 36 and the recess means 39 and such plastic surfaces have a low coefficient of friction, the valve disc 22 of this invention will readily pivot relative to the valve seat 23 to perform its valving function in the manner previously described.

Such free floating of the pivot pin-like part 36 of the valve disc 22 permits the pressure differential acting across the valve disc 22 to fully seat the same against the valve seat 23. Thus, if the plastic material 41 that covers the valve disc 22 and the plastic material 47 that covers the wettable surfaces of the valve body 21 is sufficiently resilient, the same will cold form under such pressure differential acting across the valve disc 22 in its closed condition to provide a tight seal completely around the valve seat 23 even if any misalignment is present or dirt particles interfere with the seating of the valve disc 22 against the valve seat 23 as grit or other particles disposed on the valve member 22 or valve seat 23 will be enveloped in such cold forming of the plastic material thereon. In this manner, the valve disc 22 seeks its own seat and through the resiliency of the plastic covering material, will provide a tight seal even if slight misalignment is initially provided between the valve disc 22 and the valve seat 23.

Further, by so shaping the metallic parts of the valve disc 22 and the housing body 21, the metallic parts of the valve disc 22 and housing body 21 can be machined to backup the plastic material so that should the plastic material be destroyed in the seating area of the valve construction 20 during the use thereof, such as by a fire, the metallic parts of the valve disc 22 and valve seat 23 will permit the valve disc 22 to completely close the valve seat in the housing body 21 to prevent flow of fluid therethrough which might feed such fire and thereby continue a hazardous condition.

Thus, the valve disc 22 and the housing body 21, while normally being covered with plastic material to form a tight seal at the valve seat thereof when the valve disc 22 is in a closed condition, will provide a metal-to-metal back up arrangement that will also close the valve seat in a sealing manner should the plastic material be destroyed.

Accordingly, it can be seen that the two parts 21 and 22 of the valve construction 20 of this invention are relatively simple parts that are completely covered in all of the wettable areas thereof with plastic material with the valve disc 22 being pivotally mounted to the housing body 21 in a floating manner without requiring any openings in the housing body 21 through which fluid might leak as the pivot pin-like part 36 of the valve disc 22 is merely loosely received in the recess means 39 of the housing body 21 in a floating manner to pivotally mount the same thereto in the manner previously described. Thus, the valve disc 22 can seek its own seat with the valve seat 23 and, through the aforementioned cold forming of the plastic material on the valve disc 22 and valve seat 23, will provide a tight seal against the valve seat 23 when the pressure differential across the same closes the valve disc 22 against the valve seat 23.

In addition, it can be seen that relatively inexpensive metallic material can be utilized for the valve disc 22 and the housing body 21 of this invention as the same are completely covered by plastic material which will prevent an attack thereon by the corrosive fluids and the like being passed through the valve construction 20.

Further, since the valve construction 20 of this invention is clamped between the mating flanges 29 and 30 of the conduits 27 and 28 as illustrated in FIG. 3, there is no opening provided or required in the assembly for the pivot arrangement 36 that can leak corrosive liquid and the like to the exterior of the assembly. In particular, it is essential that there not be any point for external leakage around the pivot arrangement of a corrosion valve construction and normally the sealing at the pivot arrangement is accomplished by means of a tapped pipe plug arrangement which seals the pivoting arrangement against external leakage. This can not be done when all wetted surfaces are plastic coated. Thus by having the pivot pin 36 of the valve member 22 be carried thereby and not pass through an opening through the housing 21, the valve construction 20 of this invention permits all wettable surfaces thereof to be plastic coated and still not have any adverse external leakage points.

Therefore, it can be seen that this invention provides an improved wafer-type swing check valve construction that provides for tight sealing of the valve seat thereof and substantially corrosion free pivoting movement of the disc valve thereof relative to the valve seat thereof in the unique manner previously set forth.

While the form of this invention now preferred as been illustrated and described as required by the Patent Statute, it is to be understood that other forms can be utilized and still fall within the scope of the appended claims.

What is claimed is:

1. In a wafer-type swing check valve construction having a metallic housing body provided with an inlet and an outlet interconnected together by a valve seat that is adapted to be opened and closed by the effect of a pressure differential acting across a metallic valve disc pivotally mounted to said housing body by a pivot pin-like part of said disc that has opposed ends thereof rotatably received in cooperating recess means in said housing body to provide a pivot arrangement for said valve disc, said valve disc cooperating with said valve seat to define a seating area therewith, the improvement comprising resilient corrosion resistant plastic material completely covering said valve disc and said pivot pin-like part thereof and all of the wettable areas of said housing body so that said housing body and said valve disc and said pivot pin-like part thereof are completely protected from corrosive fluids and the like that might be passed through said valve construction, said plastic material also providing for corrosion free pivoting action of said pivot pin-like part in said recess means as said valve disc is moved by said pressure differential relative to said valve seat and permitting said valve disc to form a tight seal with said valve seat when said pressure differential closes said valve disc against said valve seat, said housing body initially having opening means passing therethrough and said plastic material filling said opening means to close the same and integrally join together parts of said plastic material disposed on opposite sides of said housing body, said opening means connecting with said portions of said housing body that define the parts of said recess means that contact said plastic material on said pivot pin-like part of said valve disc.

2. A wafer-type swing check valve construction as set forth in claim 1 wherein said plastic material in said seating area is adapted to cold form to provide said tight seal of said valve disc with said valve seat when said pressure differential closes said valve disc against said valve seat.

3. A wafer-type swing check valve construction as set forth in claim 2 wherein said metallic valve disc and said metallic valve seat provide a back-up metal to metal seal for maintaining said valve seat closed should a fire or the like destroy said plastic material in said seating area of said valve construction.

4. A wafer-type swing check valve construction as set forth in claim 1 wherein said valve disc initially has opening means passing therethrough and said plastic material fills said opening means to close the same and integrally join together parts of said plastic material disposed on opposite sides of said valve disc.

5. A wafer-type swing check valve construction as set forth in claim 4 wherein said valve disc comprises a substantially circular disc portion having a flange extending therefrom, said flange carrying said pivot pin-like part in spaced relation to said disc portion, one of said opening means intitially passing substantially through the center of said disc portion and another of said opening means initially passing through said flange intermediate said disc portion and said pivot pin-like part.

6. A wafer-type swing check valve construction as set forth in claim 1 wherein said resilient corrosion resistant plastic material covering substantially all of said wettable areas of said housing body also covers the portions of said housing body that define the parts of said recess means that contact said plastic material on said pivot pin-like part of said valve disc to further tend to provide for said substantially corrosion free pivoting action of said pivot pin-like part in said recess means.

7. A wafer-type swing check valve construction as set forth in claim 1 wherein said plastic material covering substantially all wettable areas of said housing body that are exposed to corrosive fluids and the like that might be passed through said valve construction also covers said valve seat thereof and thereby defines part of said plastic material that is carried in said seating area to provide for said tight seal thereof.

8. A wafer-type swing check valve construction as set forth in claim 1 wherein said housing body has opposed surfaces respectively for joining with a pair of coupling means to couple said valve construction in a fluid system, said plastic material that covers said wettable areas of said housing body also substantially covering said opposed surfaces of said housing body.

9. A wafer-type swing check valve construction as set forth in claim 1 wherein said housing body has annular grooves therein receiving said plastic material therein to hold said covering plastic to said housing body.

10. A wafer-type swing check valve construction as set forth in claim 9 wherein said grooves each has a truncated triangular cross-sectional configuration.

11. A wafer-type swing check valve construction as set forth in claim 1 wherein said recess means of said housing body are cup-shaped so as to not pass through said housing body to the exterior thereof whereby said pivot arrangement does not provide any adverse leakage path through said housing body to the exterior thereof.

12. In a combination of a wafer-type swing check valve construction and a pair of conduits having adjacent flange means clamping said check valve construction therebetween to couple said conduits together, said wafer-type swing check valve construction having a metallic housing body provided with an inlet and an outlet respectively interconnected to said conduits and interconnected together by a valve seat that is adapted to be opened and closed by the effect of a pressure differential acting across a metallic valve disc pivotally mounted to said housing body by a pivot pin-like part of said disc that has opposed ends thereof rotatably received in cooperating recess means in said housing body to provide a pivot arrangement for said valve disc, said valve disc cooperating with said valve seat to define a seating area therewith, the improvement comprising resilient corrosion resistant plastic material completely covering said valve disc and said pivot pin-like part thereof and all of the wettable areas of said housing body so that said housing body and said valve disc and said pivot pin-like part thereof are completely protected from corrosive fluids and the like that might be passed through said valve construction, said plastic material also providing for corrosion free pivoting action of said pivot pin-like part in said recess means as said valve disc is moved by said pressure differential realtive to said valve seat and permitting said valve disc to form a tight seal with said valve seat when said pressure differential closes said valve disc against said valve seat, said housing body initially having opening means passing therethrough and said plastic material filling said opening means to close the same and integrally join together parts of said plastic material disposed on opposite sides of said housing body, said opening means connecting with said portions of said housing body that define the parts of said recess means that contact said plastic material on said pivot pin-like part of said valve disc.

13. A combination as set forth in claim 12 wherein said recess means of said housing body are cup-shaped so as to not pass through said housing body to the exterior thereof whereby said pivot arrangement does not provide any adverse leakage path through said housing body to the exterior thereof, said flanges of said conduits mating with said housing body and preventing any leakage therebetween to the exterior of said conduits and said housing body.

* * * * *